United States Patent
Drader et al.

(10) Patent No.: US 8,963,069 B2
(45) Date of Patent: Feb. 24, 2015

(54) DEVICE HAVING SPAD PHOTODIODES FOR DETECTING AN OBJECT WITH A SELECTION OF A NUMBER OF PHOTODIODES TO BE REVERSED BIASED

(71) Applicant: STMicroelectronics (Grenoble 2) SAS, Grenoble (FR)

(72) Inventors: Marc Drader, Lans en Vercors (FR); Pascal Mellot, Lans en Vercors (FR)

(73) Assignee: STMicroelectronics (Grenoble 2) SAS, Grenoble (FR)

( * ) Notice: Subject to any disclaimer, the term of this patent is extended or adjusted under 35 U.S.C. 154(b) by 228 days.

(21) Appl. No.: 13/719,070

(22) Filed: Dec. 18, 2012

(65) Prior Publication Data

US 2013/0153754 A1     Jun. 20, 2013

(51) Int. Cl.
| | |
|---|---|
| *H01L 31/00* | (2006.01) |
| *G01J 1/02* | (2006.01) |
| *G01S 17/02* | (2006.01) |
| *G01S 17/10* | (2006.01) |
| *G01S 17/89* | (2006.01) |
| *G01S 7/481* | (2006.01) |
| *G01S 7/484* | (2006.01) |
| *G01S 7/486* | (2006.01) |
| *G01S 7/489* | (2006.01) |

(52) U.S. Cl.
CPC ............. *G01J 1/02* (2013.01); *G01S 17/026* (2013.01); *G01S 17/107* (2013.01); *G01S 17/89* (2013.01); *G01S 7/4814* (2013.01); *G01S 7/4816* (2013.01); *G01S 7/484* (2013.01); *G01S 7/486* (2013.01); *G01S 7/489* (2013.01)
USPC ....................................... 250/214.1; 250/221

(58) Field of Classification Search
USPC ........ 250/214.1, 221, 214 R, 559.38; 356/73; 340/555–557; 327/514
See application file for complete search history.

(56) References Cited

U.S. PATENT DOCUMENTS

| | | |
|---|---|---|
| 5,455,669 A | 10/1995 | Wetteborn |
| 7,547,872 B2 | 6/2009 | Niclass et al. |
| 8,338,858 B1 * | 12/2012 | Bastiaans et al. ............. 257/186 |
| 2005/0213074 A1 | 9/2005 | Hoashi |
| 2011/0240865 A1 | 10/2011 | Frach et al. |

FOREIGN PATENT DOCUMENTS

| | | |
|---|---|---|
| JP | 2001-318146 A | 11/2001 |
| WO | 2011/029645 A1 | 3/2011 |

OTHER PUBLICATIONS

D. Stoppa et al., *A single-photon-avalance-diode 3d imager*, Proceedings of the 31$^{st}$ European Solid-State Circuits Conference, Piscataway, NJ, Sep. 12, 2005, pp. 487-490.

* cited by examiner

Primary Examiner — Que T Le
(74) Attorney, Agent, or Firm — Seed IP Law Group PLLC (57) ABSTRACT

The disclosure relates to a method for detecting the presence of an object near a detection device, comprising: reverse biasing single photon avalanche photodiodes, at a bias voltage greater than a breakdown voltage of a PN junction of each photodiode, emitting pulses of an incident photon beam, detecting photodiodes which avalanche trigger after the reception by the photodiode of at least one photon of a reflected photon beam produced by a reflection of the incident beam on an object near the detection device, determining the object presence as a function of the existence of at least one avalanche triggering in one of the photodiodes, and selecting a number of photodiodes to be reverse biased in relation to the detection device, as a function of a load of a circuit for generating the bias voltage.

20 Claims, 3 Drawing Sheets

DEVICE HAVING SPAD PHOTODIODES FOR DETECTING AN OBJECT WITH A SELECTION OF A NUMBER OF PHOTODIODES TO BE REVERSED BIASED

BACKGROUND

1. Technical Field

The present disclosure relates to a device for detecting and measuring the distance to an object, based on a propagation time of a photon beam emitted in the form of pulses and reflected on the object. The present disclosure applies in particular to touch screens such as those used in mobile phones, and to the detection of an object near such a screen.

2. Description of the Related Art

It is known to use photodiodes as a distance detection and measurement element, using an avalanche phenomenon which may occur in the PN junctions of photodiodes. An avalanche phenomenon may occur in a diode PN junction when the diode is reverse biased near the junction breakdown voltage. This phenomenon can be used in two ways in an avalanche photodiode. If the avalanche photodiode is reverse biased just below the breakdown voltage, the photodiode then generates an electric current proportional to the intensity of the photon flux received by the photodiode, with a gain of some hundreds with a semiconductor such as silicon.

To detect low intensities of photon flux, it is known to use photodiodes which may be reverse biased above the breakdown voltage. Such photodiodes are called Single Photon Avalanche Diode (SPAD) or diodes operating in "Geiger" mode. Each time such a photodiode receives a photon, an avalanche phenomenon occurs in the photodiode PN junction, generating an intense current. To avoid destructing the photodiode by this intense current, the photodiode is connected to a quenching circuit allowing the avalanche process to be stopped some nanoseconds after appearing.

To perform a distance measurement, it is known to light a detection area with a pulsed light source such as a pulsed laser source, and to detect photons reflected by an object present in the detection area using a set of SPAD photodiodes. The distance from the object in the detection area is evaluated based on the propagation time or Time Of Flight (TOF) between the transmit time of a light pulse and the receipt time of a pulse across a photodiode, resulting from the photodiode avalanche triggering. The measure accuracy depends in particular on the duration of the light pulses emitted by the source; the shorter these pulses, the more accurate the measurement.

In an integrated circuit of complementary metal oxide semiconductor (CMOS) type, powered by a voltage around 3 to 5 V, the reverse bias of SPAD photodiodes to a voltage greater than the breakdown voltage is achieved with a bias voltage around 14 V. Such a voltage is produced by a high voltage generation circuit, for example based on a charge pump allowing the supply voltage to be increased. The high voltage generation circuit is sized taking into account the most unfavorable case where all the photodiodes of the detection circuit avalanche trigger at each pulse of a series of photon pulses emitted by the source. In addition, the detection circuit is all the more efficient, and in particular sensitive to detect an object, even a little reflecting one, since it comprises a great number of photodiodes. A SPAD photodiode may consume on average several microamperes if it avalanche triggers after each pulse of a series of photon pulses. This current is to be multiplied by the number of SPAD photodiodes in the circuit. The result is that the more photodiodes in the circuit, the greater the surface occupied by the high voltage generator, and the greater its electrical consumption, even in the absence of load.

The high voltage generation circuit therefore constitutes an element limiting the number of SPAD photodiodes of a detection circuit, in particular in the applications of the integrated circuit to a portable object such as a mobile phone, which preferably have an electrical consumption and dimensions as low as possible.

BRIEF SUMMARY

One embodiment avoids this limitation induced by the high voltage generation circuit, and provides the detection circuit with a sufficient number of SPAD photodiodes, given the measure accuracy and sensitivity desired. In one embodiment, the occupied circuit surface and electrical consumption of the high voltage generation circuit are kept low.

Embodiments relate to a method of detecting the presence of an object near a detection device, including reverse biasing single photon avalanche photodiodes, to a bias voltage greater than a breakdown voltage of a PN junction of each photodiode, emitting pulses of an incident photon beam, detecting photodiodes avalanche triggering after the reception by the photodiodes of at least one photon of a reflected photon beam produced by a reflection of the incident beam on an object near the detection device, determining the presence of an object as a function of the existence of at least one avalanche triggering in one of the photodiodes, and selecting a number of photodiodes of the detection device to be reverse biased, as a function of a load of a generation circuit generating the bias voltage, and biasing only the number of selected photodiodes.

According to an embodiment, the method comprises determining a distance to the object as a function of the time between an emission time of the incident beam and avalanche triggering times in the photodiodes after receiving at least one photon of the reflected beam.

According to an embodiment, the load of the bias voltage generation circuit is determined from the voltage, frequency or intensity of a signal internal to the bias voltage generation circuit.

According to an embodiment, the load of the bias voltage generation circuit is determined from an average number of photodiodes avalanche triggering, calculated during the emission of several successive pulses of the incident beam.

According to an embodiment, the number of photodiodes selected to be reverse biased is adjusted so as to avoid an excessive load of the bias voltage generation circuit, the voltage generation circuit being sized to reverse bias only a fraction of the number of photodiodes of the detection device, avalanche triggering at each pulse of the incident beam of a series of successive pulses.

According to an embodiment, the photodiodes are distributed into several groups of a fixed number of photodiodes, the number of photodiodes selected to be reverse biased being increased by step of a number of photodiodes corresponding to the number of photodiodes in a group, when the load of the voltage generation circuit is not excessive.

According to an embodiment, all the photodiodes of the detection device may be reverse biased if the load of the voltage generation circuit is not excessive.

According to an embodiment, if the load of the voltage generation circuit becomes excessive, then the number of photodiodes that are reversed biased is decreased by 50% to 90%.

According to an embodiment, the method comprises: generating a first signal at the emission frequency of the pulses of the incident beam, synchronizing the start of each pulse of the first signal on an average avalanche triggering time in the photodiodes, generating a second signal having a determined state during an out-of-phase period between the first signal and a third signal at the emission frequency of the pulses of the incident beam, and when the first signal is synchronized, measuring a time during which the second signal is in the determined state, a measure of distance with the object being determined as a function of the measured time.

According to an embodiment, the third signal is a control signal for controlling a source emitting the incident beam, or a signal which start of each pulse is synchronized on an average avalanche triggering time in reverse biased photodiodes of a reference unit optically coupled to the source emitting the incident beam, to determine transmission times of the pulses of the incident beam.

Embodiments also relate to a device for detecting the presence of an object, comprising: an emission circuit for emitting pulses of an incident photon beam, a detection circuit comprising several single photon avalanche photodiodes, and a voltage generation circuit for generating a bias voltage greater than a breakdown voltage of a PN junction of each photodiode, the detection device being configured to implement the method as previously defined.

According to an embodiment, the method comprises a reference detection circuit comprising several single photon avalanche photodiodes, optically coupled to the emission circuit to detect an emission time of each emitted pulse of the incident beam.

According to an embodiment, the method comprises a switching circuit comprising an input receiving the bias voltage and several outputs, each supplying the bias voltage to a group of photodiodes of the detection circuit, and switching elements to selectively connect the input to one or several of the outputs, the switching elements being controlled as a function of the load of the voltage generation circuit.

According to an embodiment, the voltage generation circuit comprises a charge pump to generate the bias voltage from a supply voltage of the detection device, lower than the bias voltage.

According to an embodiment, the method comprises a first synchronization circuit for synchronizing the start of each pulse of a first signal having the emission frequency of the pulses of the incident beam, on an average avalanche triggering time in the photodiodes, the synchronization circuit comprising a phase shifter receiving a control signal for controlling a source emitting the incident beam, and supplying the first signal, two AND logic gates, each receiving the first signal and a detection signal comprising a pulse each time one of the photodiodes avalanche triggers, the output of the AND gates respectively controlling charge or discharge of a capacitor whether a pulse of the detection signal appears during or outside a pulse of the first signal, the voltage across the capacitor controlling the phase shifter, the device comprising a comparator for comparing the first signal to a second signal having the frequency of the control signal, and a time measurement circuit for measuring a time during which the output signal of the comparator is in the high state.

According to an embodiment, the method comprises a second synchronization circuit for synchronizing the start of each pulse of the second signal having the emission frequency of the pulses of the incident beam, on an average avalanche triggering time in the reverse biased photodiodes of a reference unit optically coupled to the source emitting the incident beam, to determine emission times of the pulses of the incident beam.

BRIEF DESCRIPTION OF THE SEVERAL VIEWS OF THE DRAWINGS

Embodiments of the disclosure will be described hereinafter, in relation with, but not limited to the appended figures wherein.

DETAILED DESCRIPTION

Figure 1:
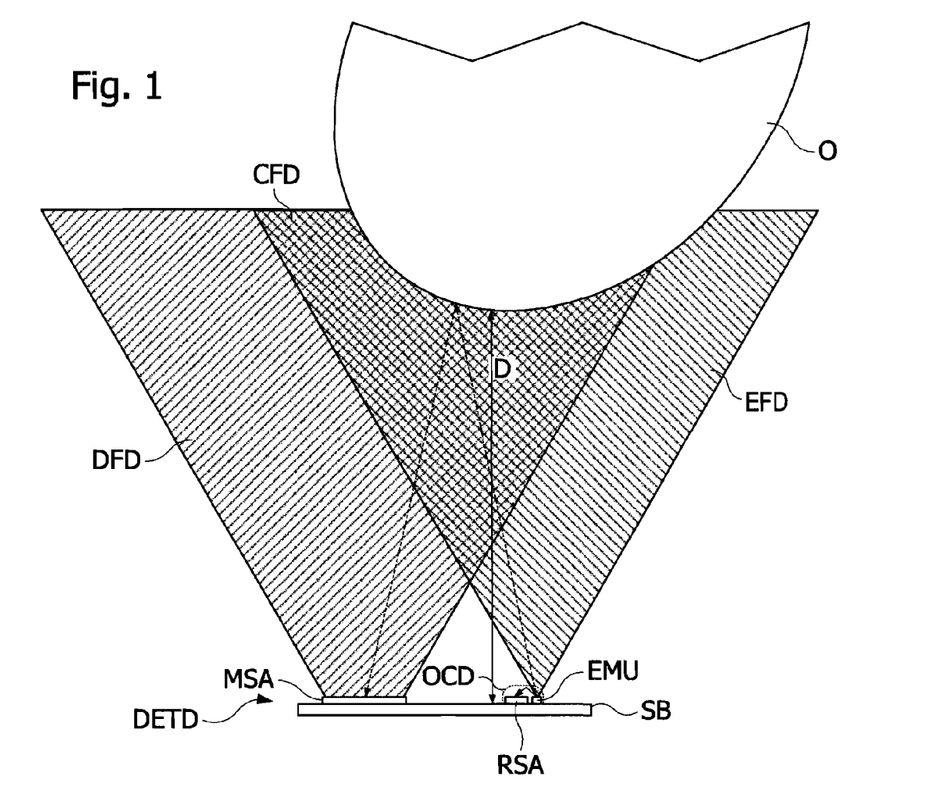
FIG. 1 schematically shows a device for detecting an object, according to one embodiment.

FIG. 1 shows a detection device DETD, according to one embodiment. Detection device DETD comprises a light emission unit EMU emitting photon pulses, a reception unit MSA, and a reference reception unit RSA. The reception unit MSA and the reference reception unit RSA are sensitive to the photon pulses emitted by the light emission unit EMU. The light emission unit EMU, the reception unit MSA, and the reference reception unit RSA are formed on a wafer SB for example in a semiconductor material. The light emission unit EMU emits photon pulses in an emission field EFD for example of conical shape whose top is centered on light emission unit EMU. The reception unit MSA is sensitive to photons coming from a detection field DFD which may also be of conical shape. Fields EFD and DFD have a common area, forming a common detection field CFD in which an object O may be detected by detection device DETD by reflecting photons emitted by light emission unit EMU toward reception unit MSA.

Reference unit RSA is optically coupled to emission unit EMU by an optical coupling device OCD configured to send toward reference reception unit RSA a part of the photons emitted by light emission unit EMU. The light emission unit EMU comprises one or more electroluminescent diodes or a laser diode emitting photon pulses in a certain wavelength range. The reception unit MSA may be associated with an optical filter letting photons belonging to the wavelength range of the emission unit pass, excluding photons with other wavelengths. Wafer SB and the light emission unit EMU, the reception unit MSA, and the reference reception unit RSA may be protected by a plate (not shown) in a material transparent to the wavelengths emitted by light emission unit EMU. The reception unit MSA, and possibly the reference reception unit RSA comprises single photon avalanche photodiodes SPAD, which are reverse biased to a bias voltage greater than the breakdown voltage of the PN junction of the photodiodes. Each time a photodiode of unit MSA or RSA avalanche triggers, it generates an electrical pulse. The wavelength range of the photons emitted by light emission unit EMU may be outside visible wavelengths, for example infrared or near infrared.

Figure 2:
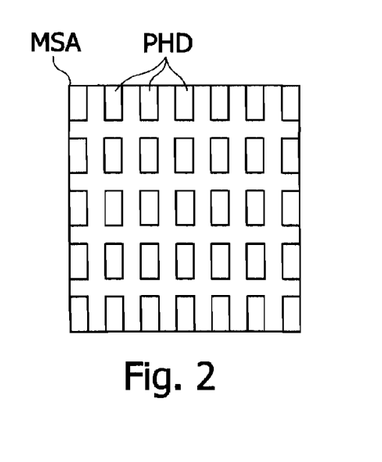
FIG. 2 shows a detection surface based on SPAD photodiodes, of the detection device.

FIG. 2 shows a detection surface of reception unit MSA. The reception unit MSA comprises several photodiodes PHD arranged according to a matrix distribution, in lines and columns transverse to lines. In the example of FIG. 2, reception unit MSA comprises 35 photodiodes PHD distributed on five lines and seven columns.

Figure 3:
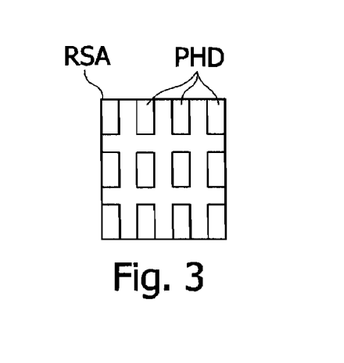
FIG. 3 shows a detection surface of a reference signal, based on SPAD photodiodes, of the detection device.

FIG. 3 shows a detection surface of reference reception unit RSA. The reference reception RSA comprises several photodiodes PHD arranged according to a matrix distribution, in lines and columns transverse to lines. In the example of FIG. 3, reference reception unit RSA comprises twelve photodiodes PHD distributed on three lines and four columns.

Detection device DETD measures the time between pulse receipt times in signals from the photodiodes of reference reception unit RSA and pulse receipt times in signals from the photodiodes of reception unit MSA. A distance between the object O and device DETD may then be deduced from the time between these receipt times, corresponding to the propagation time of the light emitted by light emission unit EMU to reflect on the object O, and reach reception unit MSA. To that end, detection device DETD may be configured to count a number of pulses by cycle of a clock signal in detection signals supplied by reception units MSA, RSA. Each pulse in these detection signals corresponds to a photodiode PHD avalanche triggering after receiving a photon. The pulse count data are used to constitute for each measurement cycle triggered by the emission of a photon pulse by light emission unit EMU, a histogram comprising a number of photodiodes PHD avalanche triggering by clock cycle. Each measurement cycle spreads on several clock cycles and may last some nanoseconds, for example between 5 and 15 ns, for example 10 ns to detect an object at less than 20 cm from the detection device. Indeed, the light propagation time to reflect on an object located at 10 cm from reception unit MSA and reach it, is around 0.666 ns. Each histogram obtained may then be used to determine reception times, respectively by reference reception unit RSA and reception unit MSA, of the photon pulse emitted by light emission unit EMU. A distance from the object O which reflected the photon pulse emitted by light emission unit EMU to reception unit MSA, is then determined by calculating the time between the determined reception times. The distance to the object O may then be deduced by multiplying this time by the light speed divided by two, to take into account the light round trip. If a null or insignificant counting is obtained from the signals supplied by reception unit MSA, it is considered that no object is near the detection surface of reception unit MSA.

Figure 4A:
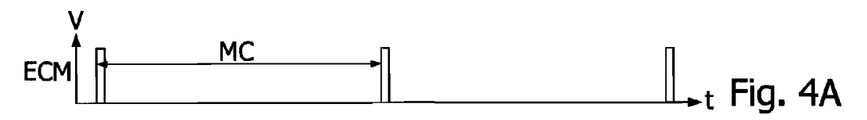
FIGS. 4A, 4B are timing diagrams showing the operation of the detection device.
Figure 4B:
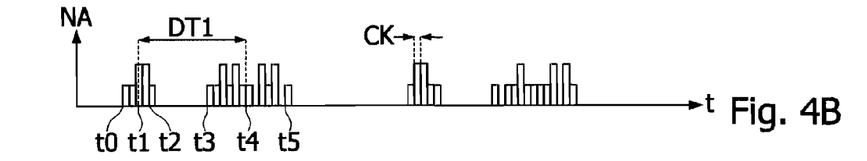

FIGS. 4A, 4B show timing diagrams of the emission triggering signal of photon pulses by light emission unit EMU, and the histogram constituted as a function of time by device DETD from signals supplied by the reception unit MSA and the reference reception unit RSA. The timing diagrams of FIGS. 4A, 4B show two measurement cycles MC, each delineated by two successive pulses of the control signal of light emission unit EMU (FIG. 4A). The histogram of FIG. 4B shows the number NA of photodiodes avalanche triggering at each clock cycle of duration CK. Times t1, t4 of reception of a photon pulse by each of the reference reception unit RSA and the reception unit MSA may be determined from start and end pulse reception times t0, t2 (for reference reception unit RSA) and t3, t5 (for reception unit MSA), by calculating an average of the start times t0, t3 and end times t2, t5, i.e., t1=t0+(t2−t0)/2 and t4=t3+(t5−t3)/2. Times t1, t4 may also be determined by a weighted average calculation, taking into account the number NA of photodiodes triggered at each clock cycle, supplied by the histogram. Thus, in the example of FIG. 4B, 7 photodiodes avalanche triggered in reference reception unit RSA between times t0 and t2, and time t2 is offset from time t0 by 4 clock cycles of duration CK. Time t1 may be calculated as follows:

$$t1 = t0 + 1/7 \times (CK + 2(2CK) + 2(3CK) + 4CK)$$
$$= t0 + 15/7 \times CK.$$

Likewise, in the example of FIG. 4B, fifteen photodiodes avalanche triggered in reception unit MSA between times t3 and t5, and time t3 is offset from time t3 by 12 clock cycles of duration CK. Time t4 may be obtained by a weighted average calculation, as follows:

$$t4 = t3 + 1/15 \times (CK + 2(2CK) + 3CK + 2(4CK) + 5CK + 6CK +$$
$$2(8CK) + 9CK + 2(10CK) + 12CK)$$
$$= t3 + 84/15 \times CK.$$

Knowing times t1 and t4 then makes it possible to evaluate a propagation time DT1 (=t4−t1) of the photon pulse between light emission unit EMU and reception unit MSA. Distance D between detection device DETD and object O may then be calculated as follows:

$$D = DT1 \times c/2, \text{ where } c \text{ is the light speed.}$$

Figure 5:
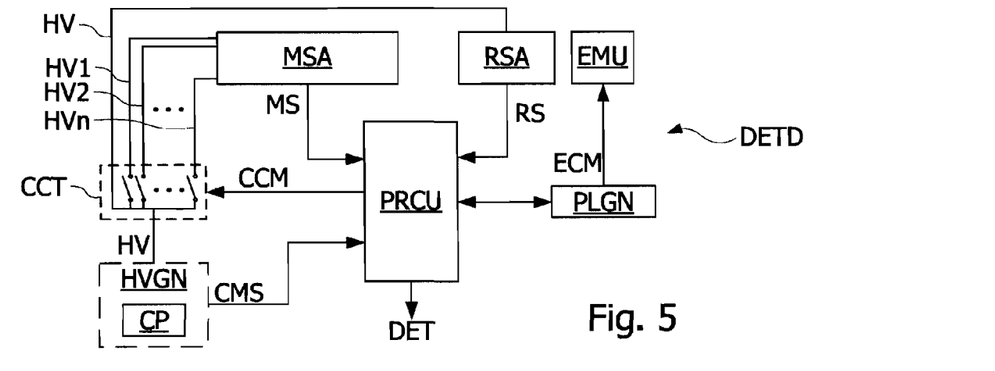
FIG. 5 schematically shows circuits of the detection device, according to one embodiment.

FIG. 5 shows circuits of the detection device DETD. Device DETD comprises, in addition to units MSA, RSA and EMU, a process unit PRCU, a pulse generation circuit PLGN, and a high voltage generation circuit HVGN. High voltage generation circuit HVGN supplies a high voltage HV to the reception units RSA, MSA to reverse bias the photodiodes PHD of these units, to a voltage greater than the breakdown voltage of the PN junction of the photodiodes. The process unit PRCU supplies control signals to pulse generation circuit PLGN. Pulse generation circuit PLGN generates a signal ECM comprising periodic pulses, transmitted to light emission unit EMU to trigger the emission of a photon pulse at each pulse of signal ECM. The reception units RSA, MSA supply measurement signals RS, MS transmitted to process unit PRCU. Each signal RS, MS comprises a pulse each time a corresponding photodiode avalanche triggers after the photodiode receives a photon. The process unit PRCU processes measurement signals RS, MS, as previously described, to determine the presence of an object O in detection field DFD of reception unit MSA, and possibly to determine the distance between object O and reception unit MSA.

High voltage generation circuit HVGN may comprise a charge pump CP to generate, from a supply voltage of device DETD, a sufficiently high voltage HV to reverse bias photodiodes PHD of the reception units MSA, RSA, to a voltage greater than a breakdown voltage of the photodiodes. The voltage HV may be around 12 V to 17 V, for example 14 V, whereas the supply voltage of the detection device DETD is around 2 to 5 V, for example 3 V.

According to one embodiment, detection device DETD comprises a switching circuit CCT. Switching circuit CCT is configured to selectively transmit the high voltage HV, to one or more lines HV1, HV2, ... HVn connected to reception unit MSA, as a function of a control signal CCM transmitted by the process unit PRCU. High voltage generation circuit HVGN is configured to provide the process unit PRCU with a measurement signal CMS representing the operation of high voltage generation circuit HVGN, and in particular its load. Measurement signal CMS may be a measurement of current voltage, frequency or intensity of a signal internal to circuit HVGN. Each line HV1-HVn is connected to a group of one or more photodiodes PHD of reception unit MSA to reverse bias the photodiodes of the group. High voltage generation circuit HVGN may also supply high voltage HV to reference reception unit RSA, possibly through switching circuit CCT, to reverse bias all the photodiodes PHD of unit RSA.

That way, few photodiodes may be biased when reception unit MSA is highly lighted by the beam reflected by the object O, and all the photodiodes of reception unit MSA may be biased in the absence of reflected beam or when the intensity of the reflected beam is low.

According to one embodiment, high voltage generation circuit HVGN is sized to reverse bias only a fraction of the number of photodiodes of reception unit MSA, and possibly all the photodiodes of reference reception unit RSA, when all the biased photodiodes avalanche trigger at each measurement cycle MC of several successive measurement cycles.

In addition, process unit PRCU may be configured to compare measurement signal CMS from high voltage generation circuit HVGN, to a threshold value, periodically, at comparison cycles. If at a comparison cycle, a comparison reveals that the load of high voltage generation circuit HVGN is too high, process unit PRCU controls switching circuit CCT to disconnect one or more lines HV1-HVn of high voltage generation circuit HVGN, so as not to bias one or more groups of photodiodes PHD of reception unit MSA. At each comparison cycle, as long as measurement signal CMS reveals that the load of circuit HVGN is not excessive, process unit PRCU controls switching circuit CCT to connect one or more lines HV1-HVn not connected to high voltage generation circuit HVGN, and thus bias one or more additional groups of photodiodes PHD of reception unit MSA. The duration of a comparison cycle may be of 10 to 100 measurement cycles MC.

Figure 6:
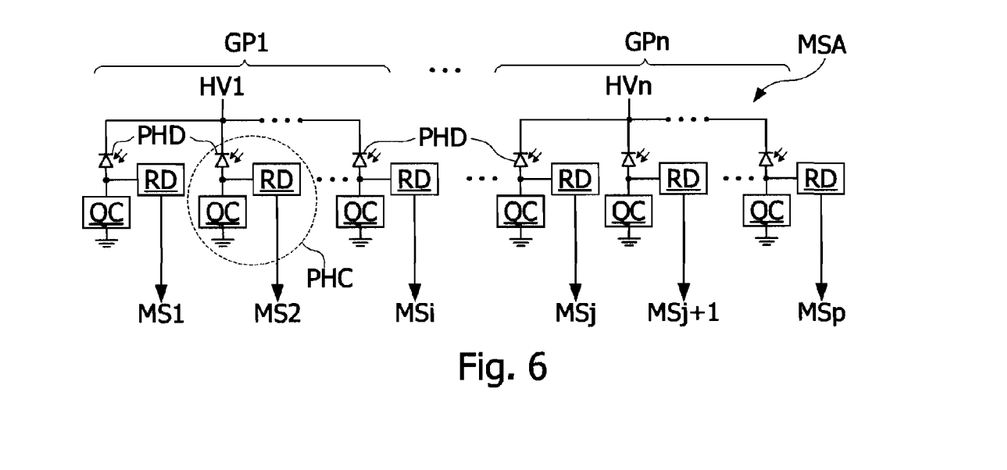
FIG. 6 schematically shows a detection unit of the detection device, according to one embodiment.

FIG. 6 shows reception unit MSA. The reception unit MSA comprises several photodiode circuits PHC, each comprising a photodiode PHD of SPAD type, a signal shaping circuit RD supplying a detection signal MS1, MS2, . . . MSi, . . . MSp, and an avalanche quenching circuit QC allowing the photodiode to be protected as soon as it avalanche triggers. The photodiode PHD of each photodiode circuit PHC comprises a cathode connected to one of lines HV1-HVn and an anode connected to a shaping circuit RD. The anode of the photodiode is also connected to the ground through a quenching circuit QC. The photodiode circuits PHC are distributed in groups GP1-GPn of at least one circuit PHC, each group being connected to a line HV1-HVn. Each detection signal MS1-MSp is for example a binary signal comprising a pulse of fixed duration, whose start coincides with the time when the corresponding photodiode PHD avalanche triggers after receiving a photon. The duration of a pulse in signals MS1-MSp may be fixed at a value between 1 and 3 ns. All the signals MS1-MSp of FIG. 6 correspond to the signals MS from reception unit MSA in FIG. 5. Quenching circuit QC may be a simple MOS transistor whose gate receives a control signal to control the transistor in the conductive state to reverse bias the photodiode so that it may detect a photon, and block the transistor when the diode PHD avalanche triggers.

In the example of FIG. 2, each group of photodiodes GP1-GPn may correspond to a column of 5 photodiodes, so that the photodiodes of reception unit MSA are distributed in 7 groups. More generally, each group of photodiodes GP1-GPn may comprise a photodiode in each line and in a column different from the columns to which the other photodiodes of the group belong.

The reference reception unit RSA may comprise photodiode circuits identical to those PHC of reception unit MSA, and each receiving the high voltage HV, directly from high voltage generation circuit HVGN, or through switching circuit CCT. Signals RS of FIG. 5 therefore comprise one signal by photodiode PHD of unit RSA.

Figure 7:
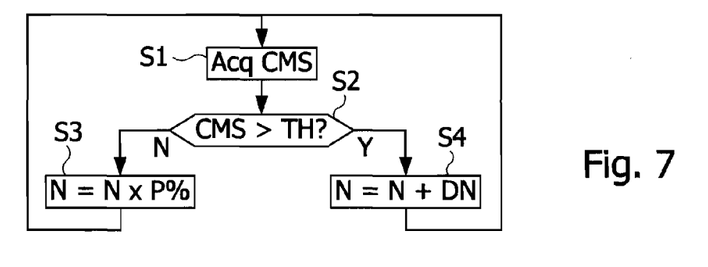
FIG. 7 shows a sequence of steps executed by the detection device, according to one embodiment.

FIG. 7 shows a sequence of steps S1 to S4, executed by process control unit PRCU. At step S1, a measurement value CMS is acquired on the operation of high voltage generation circuit HVGN. At step S2, the acquired measurement value CMS is compared to a threshold value TH. If a comparison indicates that the load of high voltage generation circuit HVGN is excessive, meaning the number of photodiodes avalanche triggering at each measurement cycle CM is too high for high voltage generation circuit HVGN, step S3 is executed, if not step S4 is executed. At step S3, switching circuit CCT is controlled to decrease in a proportion of P % the number N of photodiodes biased by high voltage generation circuit HVGN. At step S4, switching circuit CCT is controlled to increase by a certain amount DN the number N of photodiodes biased by high voltage generation circuit HVGN. The amount DN may be equal to one or several times the number of photodiodes by group GP1-GPn.

That way, reception unit MSA may comprise a great number of photodiodes which may all be reverse biased by high voltage generation circuit HVGN, while high voltage generation circuit HVGN may be sized to reverse bias only a small number, equal to a fraction of the number of photodiodes of reception unit MSA, which avalanche trigger at each light pulse emitted by light emission unit EMU. Detection device DETD may thus have a great sensitivity since it comprises a great number of photodiodes, without requiring a high voltage generation circuit having a great capacity to be able to simultaneously reverse bias all the photodiodes of the reception units RSA, MSA, when these photodiodes avalanche trigger at each pulse emitted by light emission unit EMU. Indeed, a photodiode may consume on average for example 8 μA if it avalanche triggers at each measurement cycle MC. If the number of photodiodes PHD to be reverse biased in the reception units MSA, RSA is of 35, high voltage generation circuit HVGN should be sized to supply a current of 35×8=280 μA. However, when no photodiode of reception unit MSA avalanche triggers, the current flowing through the reception units MSA, RSA is nearly equal to zero. High voltage generation circuit HVGN may then bias all the photodiodes of the reception units RSA, MSA, even if it is sized only to supply a current corresponding to the flowing current by a reduced number of photodiodes avalanche triggering, corresponding to the number of photodiodes of reference reception unit RSA, increased by a number corresponding to a fraction, for example equal to 5, of the number of photodiodes of reception unit MSA.

According to one embodiment, when at a comparison cycle, the comparison reveals that the load of high voltage generation circuit HVGN is excessive, switching circuit CCT may be controlled to reduce the number of reverse biased photodiodes, in a high proportion, for example from 50% to 90%. However, if at a comparison cycle, the measurement signal CMS reveals that the load of high voltage generation circuit HVGN is not excessive, switching circuit CCT may be controlled to increase the number of reverse biased photodiodes in a low proportion, for example from 10% to 20%. This number may correspond to the number of photodiodes of a group GP1-GPn of photodiodes powered by a same line HV1-HVn from switching circuit CCT.

According to another embodiment, switching circuit CCT may be controlled as a function of an average number NMA of photodiodes of reception unit MSA, which avalanche trigger at each measurement cycle during a comparison cycle. The acquisition of measures CMS is then not necessary. Step S1 may then consist in determining the average number NMA of photodiodes which avalanche triggered during the previous comparison cycle. Step S2 then consists in comparing the average number NMA to a maximum number NMX of photodiodes avalanche triggering at each measurement cycle MC, that high voltage generation circuit HVGN may bias. If the average number NMA is greater than maximum number NMX, step S3 is executed to reduce the number of reverse biased photodiodes, if not step S4 is executed. At step S3, the number of photodiodes to be biased may for example be calculated by multiplying the number N of photodiodes reverse biased at the previous comparison cycle by the ratio NMX/NMA between number NMX and the average number of photodiodes which avalanche triggered NMA at the previous comparison cycle.

According to another embodiment, adjusting photodiodes to be biased at each measurement cycle may be made both as a function of the measurement signal CMS and the average number of photodiodes which avalanche triggered during the previous comparison cycle. Thus, if at a comparison cycle, measurement signal CMS reveals that the load of high voltage generation circuit HVGN is excessive, step S3 may be executed. If not, step S4 may be executed.

Figure 8:
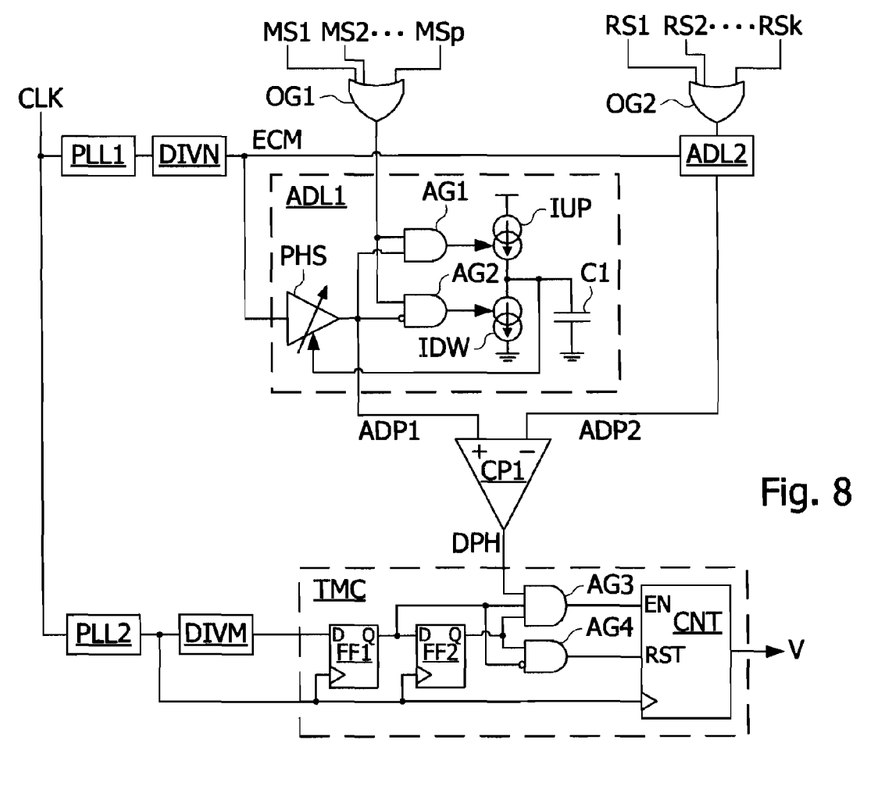
FIG. 8 shows circuits of the detection device, according to another embodiment.

FIG. 8 shows circuits of process unit PRCU, according to one embodiment. In FIG. 8, process unit PRCU comprises two logic gates of OR type OG1, OG2, gate OG1 receiving signals MS1-MSp and gate OG2 receiving signals RS (RS1-RSk) from reference reception unit RSA. The process unit PRCU comprises two phase-locked loop circuits PLL1, PLL2, two frequency dividers DIVN, DIVM, two delay-locked loop analog circuits ADL1, ADL2, a comparator CP1, and a time measurement circuit TMC.

A clock signal CLK is supplied to the inputs of phase-locked loop circuits PLL1, PLL2. Divider DIVN is connected in input to an output of phase-locked loop circuit PLL1 and in output to an input of each analog circuit ADL1, ADL2. Phase-locked loop circuit PLL1 and divider DIVN allow signal ECM for controlling light emission unit EMU to be generated. Phase-locked loop circuit PLL1 increases the frequency of clock signal CLK by a certain factor, and divider circuit DIVN divides the output frequency of phase-locked loop circuit PLL1 by a factor N, so that signal ECM has a frequency lower than the maximum avalanche triggering frequency in the photodiodes PHD. The output of gate OG1 is connected to an input of analog circuit ADL1, and the output of gate OG2 is connected to an input of analog circuit ADL2. Comparator CP1 receives in input, an output signal ADP1, ADP2 from each analog circuit ADL1, ADL2, and supplies a phase-shift signal DPH between signals ADP1, ADP2.

Analog circuits ADL1, ADL2 are identical, only the internal circuits of circuit ADL1 being shown in FIG. 8 for simplicity reasons. Thus, each analog circuit ADL1, ADL2 comprises an adjustable phase-shifter PHS, two logic gates of AND type AG1, AG2, two adjustable current sources IUP, IDW, and a capacitor C1. Signal ECM is provided to the input of phase-shifter circuit PHS. The output of phase-shifter circuit PHS which constitutes a signal output ADP1 of analog circuit ADL1, is connected to a direct input of gate AG1 and an inverting input of gate AG2. The output of gate OG1 is connected to a direct input of each gate AG1, AG2. The output of gate AG1 controls the activation of current source IUP and the output of gate AG2 controls the activation of current source IDW. In other words, when one or the other gate AG1, AG2 is active, the current source to which the gate is connected is also active. Current source IUP is connected between a supply voltage source and source IDW, and source IDW is connected between source IUP and the ground. The connection node between sources IUP, IDW is connected to a control input of phase-shifter circuit PHS and is connected to the ground through capacitor C1. The voltage across capacitor C1 therefore corresponds to that of the control signal of phase-shifter circuit PHS. Signal ADP1 in output of phase-shifter circuit PHS is phase-shifted from signal ECM by a phase-shift between minimum and maximum phase-shift values, and varying linearly with a positive slope, between some control voltages of phase-shifter circuit PHS. The minimum and maximum phase-shift values applied by phase-shifter circuit PHS to signal ADP1 with respect to signal ECM may for example be defined as a function of minimum and maximum object detection distances. The minimum phase-shift applied by phase-shifter circuit PHS to signal ECM may for example be equal to zero and the maximum phase-shift may be equal to a period of signal ECM.

When current source IUP is activated by the output signal of gate AG1, capacitor C1 charges, which increases the control voltage of phase-shifter circuit PHS. Conversely, when current source IDW is activated by the output signal of gate AG2, capacitor C1 discharges, which decreases the control voltage of phase-shifter circuit PHS. When the time in the high state of the output signal of gate AG1 exceeds a certain time threshold Th, current source IUP remains activated during a certain fixed time tmax. Likewise, when the time in the high state of the output signal of gate AG2 exceeds the time threshold Th, current source IDW remains activated during the fixed time tmax. If the output signals of gates AG1, AG2 are in the high state for a time lower than threshold Th, current sources IUP, IDW are activated for a time proportional to this time. Thus, during a period of signal ECM, if the output signals of gates AG1, AG2 are in the high state for a same time, the amount of current injected into capacitor C1 may be equal to zero.

At each pulse emitted by a photodiode PHD of reception unit MSA, gate AG1 switches to the high state if signal ADP1 is in the high state, which charges capacitor C1. Conversely, each pulse emitted by a photodiode PHD of reception unit MSA outside the pulses of signal ADP1, discharges capacitor C1. If the numbers of pulses emitted by the photodiodes of reception unit MSA, during and outside the pulses of signal ADP1, are equal, the charge of capacitor C1 does not change and therefore the phase-shift between signals ECM and ADP1 is not modified by phase-shifter circuit PHS. The result is that at the end of a certain number of pulses of signal ECM, the phase-shift between signals ECM and ADP1 tends to converge on a value such that the start of a pulse of signal ADP1 is in the middle of the pulses emitted by the photodiodes of reception unit MSA, during a period of signal ECM. In other words, the start of each pulse of signal ADP1 tends to be synchronized on an average pulse emitting time by the photodiodes of reception unit MSA.

Circuit ADL2 operates like circuit ADL1, with the pulses supplied by the photodiodes of reference reception circuit RSA. The result is that after a certain number of pulses of signal ECM, the phase-shift between signal ECM and signal ADP2 in output of circuit ADL2, tends to converge on a fixed value such that the start of a pulse of signal ADP2 is in the middle of the pulses emitted by the photodiodes of unit RSA, during a period of signal ECM. The start of each pulse of signal ADP2 therefore tends to be synchronized on an average pulse emitting time by the photodiodes of reference reception unit RSA.

Signal DPH supplied by comparator CP1 therefore corresponds to the phase-shift of signal ADP1 with respect to signal ADP2, i.e., to the time DT1=t4−t1 (FIG. 4B). In practice, signal ECM may have a period around 10 ns, and the convergence on a fixed phase-shift value in circuits ADL1, ADL2, allowing a correct distance measure to be supplied, may be obtained within between 1 and 10 ms at the latest, which corresponds to a number of cycles of signal ECM between 100 000 and 1 million.

An initial adjustment of the phase-shift applied by phase-shifter circuit PHS of each circuit ADL1, ADL2 may be provided. The initial adjustment may be performed by pre-charging capacitor C1 for example to half its maximal voltage in each circuit ADL1, ADL2, or to a voltage corresponding to an average detection distance. The initial adjustment allows a more rapid convergence of the phase-shift produced in each circuit ADL1, ADL2 to be obtained.

Signal DPH in output of comparator CP1 when the signals in input ADP1, ADP2 are fixed, is in the high state at each period of signal ECM for a time corresponding to the phase-shift between signals ADP1 and ADP2. Comparator CP1 may be a simple logic gate of AND type comprising a direct input receiving signal ADP1 and an inverting input receiving signal ADP2.

Measuring the time in the high state of signal DPH may be performed by means of a circuit such as circuit TMC of FIG. 8. To that end, circuit TMC comprises two flip-flops D FF1, FF2, two logic gates of AND type AG3, AG4, and a counter CNT. An output of phase-locked loop circuit PLL2 supplies a clock signal to an input of divider DIVM, and to a clock input of flip-flops FF1, FF2 and counter CNT. An output of divider DIVM is connected to an input D of flip-flop FF1. An output Q of flip-flop FF1 is connected to an input D of flip-flop FF2. Gate AG3 with three direct inputs receives in input the phase-shift signal DPH supplied by comparator CP1 and the signals in output Q of flip-flops FF1, FF2. Gate AG4 comprises a direct input connected to the output Q of flip-flop FF2 and an inverting input connected to the output Q of flip-flop FF1. The output of gate AG3 is connected to a counting input EN of counter CNT. The output of gate AG4 is connected to a reset control input of counter CNT. Counter CNT supplies a count value V representative of the time DT1 between times t1 and t4.

The frequency multiplier coefficient of phase-locked loop circuit PLL2 is chosen different but near that of phase-locked loop circuit PLL1. As an example, if signal CLK has a frequency between 1 and 10 MHz, the multiplier coefficients of phase-locked loop circuits PLL1 and PLL2 may for example be respectively chosen equal to 65 and 66. The output signal of phase-locked loop circuit PLL2 defines a counting frequency. The output signal of divider DIVM defines a counting period between two resets of counter CNT. The coefficient M of frequency divider DIVM is chosen so that the counting period corresponds to at least the smallest common multiplier of the multiplier coefficients chosen for phase-locked loop circuits PLL1 and PLL2.

Counter CNT increments at each rising edge of the output signal of phase-locked loop circuit PLL2 if the output of gate AG3 is in the high state, i.e., if signal DPH is in the high state during a counting phase (output signal of divider DIVM in the high state). Due to the frequency difference between the output signals of circuits PLL1, PLL2, the rising edges of the output signal of phase-locked loop circuit PLL2, for the counting time, occur at various times of the period of signal DPH. Thus, over a counting period, the greater the pulse duration in the high state of signal DPH, the more the counter CNT increments. The value of counter CNT at the end of the counting period is representative of the time in the high state of signal DPH. Reading the value of counter CNT at the end of the counting period allows an accurate value of the distance between an object to be detected and reception unit MSA to be obtained. Such accuracy may be obtained by means of clock signals at a frequency lower than 1 GHz, complying with the frequencies used in integrated circuits.

It may be provided to perform several counting cycles to measure an object distance, an average of the counts obtained at each of these cycles being calculated to determine a measure of distance.

It may also be provided to offset signal DTH by some periods of the output signal of phase-locked loop circuit PLL1, with respect to the start of a period of the signal in output of divider DIVN, to guarantee that each time signal DTH switches to the high state is counted by counter CNT. The duration of the pulses of signal DTH may also be artificially increased for a more accurate measure of the time in the high state of this signal, the value of counter CNT at the end of the counting period being adapted accordingly.

It is to be noted that the distance measurement may be taken without reference reception unit RSA, by directly sending signal ECM to the input of comparator CP1, and not signal ADP2. For a greater accuracy of the distance measure, the phase-shift measured by signal ADP2 may be determined once for all and systematically subtracted from signal DPH. The phase-shift measured by signal ADP2 may also be taken into account by directly applying a correction to the obtained distance measure.

It will be clear to those skilled in the art that the present disclosure is susceptible of various embodiments and applications. In particular, the disclosure is not limited to a device supplying a distance measure, but may apply to a device only supplying a detection signal indicating the presence or absence of an object near the device. In this case, it is not necessary to provide a reference reception unit RSA. In addition, if it is not necessary to determine the distance measure with a great accuracy, unit RSA may be omitted, the emission time of the incident beam may be determined from the control signal of light emission unit EMU.

It is not necessary either to bias the photodiodes by groups of photodiodes. Indeed, if the photodiodes can be individually biased, the number of biased photodiodes may be defined with a possible difference of one photodiode.

The disclosure also comprises the possible combinations of the various embodiments previously described.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method, comprising:
   detecting an object near a detection device, the detection device having a plurality of single photon avalanche photodiodes, each photodiode having a PN junction having a breakdown voltage, the detecting including:
      generating a bias voltage in a bias voltage generation circuit, the generation circuit having a load, the bias voltage being greater than the breakdown voltage of the PN junction of each photodiode;
selecting a number of the plurality of single photon avalanche photodiodes to be reversed biased based on the load on the voltage generation circuit;
reverse biasing the selected single photon avalanche photodiodes with the bias voltage;
emitting pulses of an incident photon beam, the pulses of the incident photon beam being configured to generate a reflected photon beam from a reflection on the object;
detecting ones of the photodiodes avalanche triggering in response to receiving at least one photon of the reflected photon beam; and
detecting the object as a function of the ones of the photodiodes avalanche triggering.

2. The method of claim 1, comprising determining a distance to the object as a function of time between an emission time of the incident beam and avalanche triggering times in the photodiodes after receiving at least one photon of the reflected beam.

3. The method of claim 1, further comprising determining the load on the bias voltage generation circuit from a voltage, frequency, or intensity of a signal internal to the bias voltage generation circuit.

4. The method of claim 1, further comprising determining the load on the bias voltage generation circuit from an average number of photodiodes avalanche triggering by calculating the average number of photodiodes avalanche triggering during the emission of several successive pulses of the incident beam.

5. The method of claim 1, further comprising adjusting the number of photodiodes to be reverse biased to avoid the load on the bias voltage generation circuit exceeding a threshold load value, the threshold load value being triggered when the number of photodiodes avalanche triggering exceeds a threshold number of photodiodes avalanche triggering, the bias voltage generation circuit being configured to reverse bias only a fraction of the number of photodiodes of the detection device, avalanche triggering at each pulse of the incident beam of a series of successive pulses.

6. The method of claim 5 wherein the photodiodes are distributed into several groups of a fixed number of photodiodes, increasing the number of photodiodes to be reverse biased by the fixed number of photodiodes in one of the groups, when the load on the bias voltage generation circuit is less than a threshold load value, the threshold load value being triggered when the number of photodiodes avalanche triggering exceeds a threshold number of photodiodes avalanche triggering.

7. The method of claim 5 wherein the reverse biasing includes reverse biasing all of the photodiodes of the detection device when the load on the voltage generation circuit is less than a threshold load value, the threshold load value being triggered when the number of photodiodes avalanche triggering exceeds a threshold number of photodiodes avalanche triggering.

8. The method of claim 1, further comprising decreasing the number of reverse biased photodiodes by 50% to 90% when the load on the voltage generation circuit is greater than a threshold load value, the threshold load value being triggered when the number of photodiodes avalanche triggering exceeds a threshold number of photodiodes avalanche triggering.

9. The method of claim 1, comprising:
generating a first signal at an emission frequency of the pulses of the incident beam;
synchronizing a start of each pulse of the first signal on an average avalanche triggering time in the photodiodes;
generating a second signal having a determined state during an out-of-phase period between the first signal and a third signal at the emission frequency of the pulses of the incident beam; and
determining a measure of distance from the object when the first signal is synchronized by measuring a time during which the second signal is in the determined state.

10. The method of claim 9 wherein the third signal is a control signal for controlling a source emitting the incident beam, or a signal which at a start of each pulse is synchronized on an average avalanche triggering time in reverse biased photodiodes of a reference unit optically coupled to the source emitting the incident beam, to determine emission times of the pulses of the incident beam.

11. A device, comprising:
an emission circuit for emitting pulses of an incident photon beam, the incident photon beam being configured to generate a reflection on an object;
a detection circuit including a first plurality of single photon avalanche photodiodes, each photodiode having a breakdown voltage of a PN junction, the detection circuit configured to detect the object, the detection circuit being configured to detect ones of the photodiodes avalanche triggering in response to at least one photon of a reflected photon beam from the reflection of the incident beam on the object;
a voltage generation circuit configured to generate a bias voltage greater than the breakdown voltage of the PN junction of each photodiode; and
a control circuit configured to select a number of the plurality of photodiodes to be reversed biased based on a load on the voltage generation circuit and to detect the object as a function of the ones of the photodiodes avalanche triggering.

12. The device of claim 11, comprising a reference detection circuit that includes a second plurality of single photon avalanche photodiodes, optically coupled to the emission circuit to detect an emission time of each emitted pulse of the incident beam.

13. The device of claim 11, comprising a switching circuit that includes an input receiving the bias voltage and a plurality of outputs, each output configured to supply the bias voltage to a group of the first plurality of photodiodes of the detection circuit, and switching elements configured to selectively connect the input to at least one of the outputs, the voltage generation circuit being configured to control the switching elements as a function of the load on the voltage generation circuit.

14. The device of claim 11 wherein the voltage generation circuit includes a charge pump configured to generate the bias voltage from a supply voltage of the detection device, lower than the bias voltage.

15. The device of claim 11, including:
a source configured to emit the incident beam;
a first synchronization circuit configured to synchronize a start of each pulse of a first signal having an emission frequency of the pulses of the incident beam, on an average avalanche triggering time in the photodiodes, the synchronization circuit including:
a capacitor;
a phase shifter configured to receive a control signal to control the source emitting the incident beam, and configured to supply the first signal;

two AND logic gates, each configured to receive the first signal and a detection signal that includes a pulse each time one of the photodiodes avalanche triggers, the output of the AND gates respectively configured to control charge or discharge of the capacitor whether a pulse of the detection signal appears during or outside a pulse of the first signal, the voltage across the capacitor configured to control the phase shifter;

a comparator configured to compare the first signal to a second signal having the frequency of the control signal; and a time measurement circuit configured to measure a time during which the output signal of the comparator is in a high state.

16. The device of claim 15, including a second synchronization circuit configured to synchronize a start of each pulse of the second signal having the emission frequency of the pulses of the incident beam, on an average avalanche triggering time in the reverse biased photodiodes of a reference unit optically coupled to the source emitting the incident beam, to determine emission times of the pulses of the incident beam.

17. A detection device, comprising:
a substrate;
a light emission unit on the substrate, the light emission unit configured to generate an incident photon beam;
a reception unit on the substrate, the reception unit including a plurality of single photon avalanche photodiodes, each photodiode having a PN junction having a breakdown voltage;
a voltage generator on the substrate, the voltage generator configured to generate a reverse bias voltage being greater than the breakdown voltage of the PN junction of each photodiode;
a pulse generator on the substrate; and
a control unit on the substrate and coupled to the light emission unit, the reception unit, the voltage generator, and the pulse generator, the control unit configured to select a number of the plurality of photodiodes to be reverse biased by the bias voltage based on a load on the voltage generation circuit and configured to determine a number of the photodiodes that avalanche trigger mode in response to at least one photon reflected from the incident beam on an object to detect the object near the detection device.

18. The device of claim 17, further comprising:
a switching circuit configured to provide the bias voltage to the photo diodes in the reception unit, the switching circuit configured to be controlled by a signal from the control unit.

19. The device of claim 18, further comprising:
a reference reception unit, the reference reception unit including:
a plurality of single photon avalanche photodiodes, each photodiode having a PN junction having a breakdown voltage;
the switching circuit configured to provide the bias voltage to the photodiodes in the reference reception unit.

20. The device of claim 18 wherein the control unit includes:
a first phase locked loop and a second phase locked loop;
a first divider coupled to the first phase locked loop;
a second divider coupled to the second phase locked loop;
a first analog circuit coupled to the first divider and configured to receive a first signal from the reception unit;
a second analog circuit coupled to the first divider and configured to receive a second signal from the reference reception unit;
a comparator configured to receive a first output from the first analog circuit and a second output from the second analog circuit; and
a timing circuit coupled to the second divider and configured to receive an output from the comparator.

* * * * *

UNITED STATES PATENT AND TRADEMARK OFFICE
CERTIFICATE OF CORRECTION

| | | |
|---|---|---|
| PATENT NO. | : 8,963,069 B2 | Page 1 of 1 |
| APPLICATION NO. | : 13/719070 | |
| DATED | : February 24, 2015 | |
| INVENTOR(S) | : Marc Drader et al. | |

It is certified that error appears in the above-identified patent and that said Letters Patent is hereby corrected as shown below:

ON THE TITLE PAGE

INSERT

<u>Item (30):</u>
--Dec. 20, 2011 (FR).................................116250--

Signed and Sealed this
Twenty-second Day of December, 2015

Michelle K. Lee
*Director of the United States Patent and Trademark Office*